June 28, 1960 R. H. CZINA ET AL 2,943,263

PHASE DETECTOR

Filed Aug. 20, 1957

United States Patent Office 2,943,263

Patented June 28, 1960

2,943,263

PHASE DETECTOR

Richard H. Czina, Jamaica, Raymond J. Keogh, Forest Hills, and Donald Richman, Fresh Meadows, N.Y., assignors to Hazeltine Research, Inc., Chicago, Ill., a corporation of Illinois Filed Aug. 20, 1957, Ser. No. 679,234

10 Claims. (Cl. 328—134)

*General*

Figure 1:
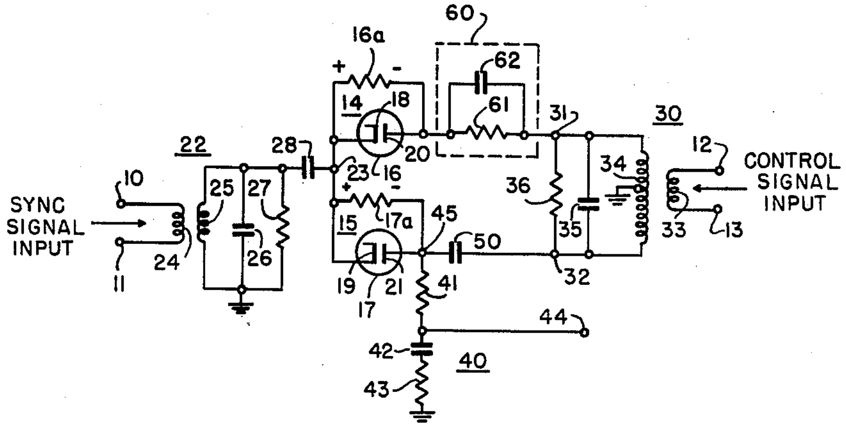

This invention relates to phase detectors and particularly to balanced phase detectors for developing an output signal representative of the difference in phase or frequency of a pair of input signals.

Balanced phase detectors of the type presently under consideration are commonly used for synchronizing a locally generated reference signal with a synchronizing signal that may be transmitted from some remote point. As such, these phase-detector circuits are commonly used in automatic-phase-control (APC) loops wherein the output control signal from the phase detector is used to control the frequency and phase of an oscillator, the output of which is the locally generated signal and is, in turn, supplied back to the phase detector to obtain the requisite comparison. A good illustration of where a phase-detector circuit is used in this manner is the case of a color-television receiver wherein the phase detector is responsive to the 3.6-megacycle color synchronizing or syn burst component of the transmitted color signal for controlling the local 3.6-megacycle subcarrier oscillator, which, in turn, controls the synchronous detection of the chrominance component of the transmitted color signal.

Most phase detectors of the balanced type are basically two peak detectors coupled in phase opposition, each adding the synchronizing and reference signals. The voltages of the two peak detectors are matrixed by their load resistors to develop an output control voltage representative of the phase difference of the input signals. This matrixing operation, however, causes a loss of half of the voltage difference between the peak detectors and, as such, reduces the sensitivity or gain of the circuit as a whole.

There has recently been proposed an improved form of balanced phase detector wherein the outputs of the two peak detectors are added together with one output coupled in series with the other as far as direct-current components are concerned. As a result, the sensitivity or gain of this phase detector is twice that of the previously used forms of phase detectors.

The primary problem with both of these forms of phase detectors is one of securing maximum sensitivity and an accurate balance. The improved form of phase detector meets the first objective, but has been found to contain various causes of unbalance giving rise to as much or more unbalance than was the case with the earlier forms of phase detectors. Unbalance is undesirable because, for one thing, the magnitude of the output control signal is relatively small, even in the case of the improved double-gain type of phase detector, so that a small degree of unbalance will cause an undesired erroneous signal component which is of the same order of magnitude as the desired control signal. Secondly, and of greater importance, is the fact that such unbalance will cause the magnitude of the erroneous signal component to vary with variations in the magnitude of the synchronizing signal. This is particularly bothersome where the magnitude of the synchronizing signal is subject to substantial variations because in that case the phase-detector circuit cannot be designed or operated to properly take into account erroneous components in the output control signal. As a result, the reliability of the control signal is decreased and, under some circumstances, may serve to drive the local oscillator further out of synchronism instead of bringing it into synchronism. This is particularly true where the phase detector is used in a color-television receiver because the amplitude of the synchronizing signal is subject to substantial variations due to varying transmission conditions and also because of the practice of deliberately varying the amplitude of the synchronizing signal depending on whether the local oscillator is in or out of synchronism.

It is an object of the invention, therefore, to provide a new and improved double-gain type of phase detector having an improved degree of balance.

It is another object of the invention to provide a new and improved double-gain type of phase detector wherein the output control signal is rendered less sensitive to amplitude variations in the input synchronizing signal.

It is a further object of the invention to provide in a double-gain type of phase detector a compensating impedance for compensating for the effect on the output signal of other elements in the phase detector which would otherwise produce unbalanced components therein.

In accordance with the invention, a phase detector having improved balance comprises circuit means for supplying a synchronizing signal and circuit means for supplying a reference signal. The phase detector also includes a pair of detector circuits, each including a rectifier device and having a first type of electrode of each device coupled together and to one of the supply circuit means and having a second type of electrode of each device coupled in push-pull with the other supply circuit means. The phase detector further includes circuit means coupled to one of the rectifier devices on the push-pull side thereof for deriving an output signal representative of the phase difference between the synchronizing and reference signals. In addition, the phase detector includes a first impedance means for isolating the point at which the output signal is derived from the push-pull input. The phase detector also includes second impedance means coupled in the path coupling the other rectifier device to the push-pull input for balancing the effect on the output signal of the first impedance means, thereby rendering the phase detector less sensitive to any amplitude variations of the synchronizing signal.

For a better understanding of the present invention, together with other and further objects thereof, reference is had to the following description, taken in connection with the accompanying drawing, and its scope will be pointed out in the appended claims.

Figure 2:
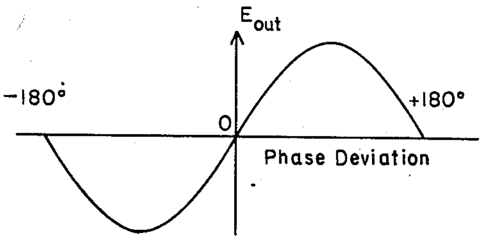

Referring to the drawing:

Fig. 1 is a circuit diagram of a representative embodiment of a phase detector constructed in accordance with the present invention, and Fig. 2 is a graph used in explaining the operation of the Fig. 1 circuit.

*Description of phase detector*

Referring to Fig. 1 of the drawing, there is shown a representative embodiment of a phase detector constructed in accordance with the present invention and having an improved degree of balance. While the phase detector of the present invention is of general applicability, its particular use in a color-television receiver shall be frequently referred to because of the fact that such environment is a case where a maximum degree of balance is very critical and, hence, is a case where the present invention may be used to very great advantage.

As illustrated in Fig. 1, the phase detector includes circuit means for supplying a synchronizing signal, such circuit means being represented by a pair of input terminals 10 and 11. It should be noted that, in the case of a color-television receiver, the synchronizing signal is not of a continuous nature, but rather comprises periodic bursts of a sinusoidal synchronizing signal, each burst having a time duration of approximately 2.5 microseconds and successive bursts occurring at the 15 kilocycle line scan rate. The phase detector also includes circuit means for supplying a reference signal, which means are represented by a pair of input terminals 12 and 13. In the case of a color-television receiver, this reference signal would be the 3.6 megacycle signal generated by the local subcarrier frequency oscillator and would be of a continuous nature.

The phase detector further includes a pair of detector circuits 14 and 15, each including a rectifier device represented, for example, by the diodes 16 and 17 and having a first type of electrode of each device, for example, the cathodes 18 and 19 coupled together and to one of the supply circuit means and having a second type of electrode of each device, for example, the anodes 20 and 21 coupled in push-pull with the other supply circuit means. Each of diodes 16 and 17 may be shunted by a load resistor as represented by the corresponding ones of load resistors 16*a* and 17*a*. More particularly, the phase detector may include a first coupling circuit 22 for coupling one of the supply circuit means, for example, the synchronizing signal input terminals 10, 11 to the diodes 16 and 17 in a single-ended manner and having a common output terminal 23 coupled to the cathodes 18 and 19. Such coupling circuit 22 may take the form of a tuned transformer circuit having a primary winding 24 and a secondary winding 25 which, together with a condenser 26 and resistor 27, form a tuned secondary circuit. The secondary circuit should be tuned to the frequency of the synchronizing signal and, in the case of a color-television receiver, it should be tuned to the 3.6-megacycle frequency of the sinusoidal component occurring during the burst intervals. The output from the tuned secondary may be supplied by way of a coupling condenser 28 to the common point 23.

In a similar manner the phase detector includes a second coupling circuit 30 for coupling the other supply circuit means as represented by the reference signal input terminals 12 and 13 to the diodes 16 and 17 in a push-pull manner and having a pair of push-pull output terminals 31 and 32 individually coupled to the anodes 20 and 21 of the diodes 16 and 17. Again, this coupling circuit may take the form of a tuned transformer circuit, in this case having a primary winding 33 and a secondary winding 34 which, together with a condenser 35 and a resistor 36, form a tuned secondary circuit. It will be noted that the secondary winding 34 is grounded at a center tap point so that the signals appearing at the output terminals 31 and 32 are 180° out of phase with one another. The tuned secondary of the coupling circuit 30 should be tuned to the frequency of the reference signal which, in the case of a color-television receiver, is again a frequency of 3.6 megacycles.

The phase detector further includes circuit means coupled to one of the diodes on the push-pull side thereof for deriving an output signal representative of the phase difference between the synchronizing and reference signals. This circuit means is represented by an output load impedance 40 and includes a resistor 41, a condenser 42, a resistor 43, and an output terminal 44. This load impedance 40 is coupled to the point 45 and, hence, is on the push-pull side of the diode 17. The load impedance 40 is a form of low-pass filter circuit and, as such, primarily determines the band width of the control signal developed at the output terminal 44. The band width of this circuit 40 is especially important in the case of a color-television receiver in determining the noise band width of the APC loop and the sensitivity of the APC loop in that environment. Such load impedance 40 is commonly referred to as an APC filter.

The phase detector further includes a first impedance means for isolating the point 45 at which the output signal is derived from the push-pull input, in this case, the push-pull input terminal 32. Such impedance means is represented by the condenser 50. It serves to isolate the direct-current components across the detector circuits 14 and 15 from ground and, as such, is necessary in order to obtain the desired double gain.

The phase detector also includes second impedance means 60 coupled in the path coupling the other diode 16 to the push-pull input for balancing the effect on the output signal of the first impedance means represented by the condenser 50, thereby rendering the phase detector less sensitive to any amplitude variations of the synchronizing signal. This impedance means 60 may take the form of a parallel-connected resistor-condenser network which includes a resistor 61 and a condenser 62. In order to properly compensate for the unbalance of the detector circuit, which unbalance is introduced primarily by the condenser 50, this impedance means or compensating impedance 60 should have an impedance which is proportioned to match that of the condenser 50. Also, for cases like that of a color-television receiver where the synchronizing signal occurs in periodic bursts, the impedance means 60 should be proportioned to have a time constant corresponding to the time duration of the bursts, which time duration is approximately 2.5 microseconds.

In the operation of the phase detector circuit, the two diodes 16 and 17 must be poled in the same direction, that is, the same type of electrodes coupled to the same input terminal, in order to obtain the desired double gain. It is not necessary, however, that they be poled in the particular direction shown in the drawing because the anodes and cathodes of both may be reversed or interchanged without affecting the operation of the circuit. Also, it is not critical whether the synchronizing signal is supplied to the single-ended coupling circuit 22 and the reference signal to the push-pull coupling circuit 30 or vice versa. In other words, if desired, the synchronizing signal could be supplied to the terminals 12 and 13 and the reference signal to the terminals 10 and 11.

*Operation of phase detector*

Considering now the operation of the balanced double-gain type of phase detector just described, such phase detector is responsive to the synchronizing and reference signal inputs to develop an output control signal representative of the phase and frequency difference between the two input signals. In accordance with the present invention, the phase detector includes a compensating impedance 60 for improving the balance of the phase detector so that the magnitude of any error or unbalance components in the output control signal is reduced.

Before considering the manner in which the compensating impedance 60 modifies the operation of the phase detector, it will be helpful to discuss the standard operation of the phase detector in the absence of such compensating impendance 60. To this end, each of the input signals is supplied to each of the detector circuits 14 and 15 so that each detector circuit is effective to rectify a composite signal representing the sum of the two inputs. If the reference signal input is in phase quadrature with the synchronizing-signal input, that is, bears a 90° phase relationship relative to the synchronizing-signal input, then the composite signal supplied to each of the detector circuits 14 and 15 is of the same magnitude so that the rectified direct-current components, which have polarities indicated by the plus and minus signs associated with the load resistors 16*a* and 17*a*, are equal. In this case the resulting direct-current component appearing across the load impedance 40 will be equal to zero. This may be seen by summing the direct-current components around the direct-current path starting at the grounded center tap of the push-pull secondary 34, ignoring the compensating impedance 60, including the component across the load resistor 16*a* and that across the load resistor 17*a*, and then returning to ground by way of the load impedance 40. In other words, the condensers 28 and 50 function as direct-current blocking elements so that the sum of the voltage of the direct-current components across the two load resistors 16*a* and 17*a* appears at the output terminal 45 or, in other words, across the load impedance 40.

The mentioned quadrature relationship between the reference signal and the synchronizing signal denotes the condition when the local oscillator is operating in the desired state of synchronism with the synchronizing signal. If one of the input signals changes from the desired quadrature relationship, then, because of the push-pull coupling of the reference signal, the resulting composite signal across one of the phase detectors 14 and 15 will increase, while the composite signal across the other one decreases. Thus, the resulting direct-current output signal across the load impendance 40 will vary in either a positive or negative manner as the phases of the two signals depart from the desired 90° relationship. The polarity of the direct-current output depends on the relative direction of the phase departure or deviation. The manner in which this direct-current output component $E_{out}$ varies with the phase deviation is indicated by the curve of Fig. 2 which has a generally sinusoidal shape.

If the reference and synchronizing signals differ in frequency instead of just differing in phase, then it will be recognized that the phase difference between the two signals is continually changing, the phase of the lower frequency signal continually falling back relative to that of the higher frequency signal. As a result, the phase deviation may be said to be varying back and forth across the phase axis of Fig. 2. As a result, a low-frequency sinusoidal signal will tend to be developed across the load impedance 40. Now, if the phase detector is included in an APC loop, the shape of this sinusoidal signal will be distorted because of the dynamic feedback of the loop and will become asymmetrical in nature. As a result, a direct-current component is again produced and increases in magnitude as the frequency difference increases. The polarity of this direct-current component will be either negative or positive, depending on which of the input signals is the higher in frequency. Thus, again a direct-current component is developed which may be used to bring the frequency of the local oscillator back into synchronism with the synchronizing signal. The asymmetrical sinusoid from which the direct-current component is developed is commonly referred to as a "beat-note" signal.

A little thought will show that the phase-detector circuit of Fig. 1 produces a so-called "double gain." This is because the direct-current components developed across the load resistors 16*a* and 17*a* add together with opposite polarities. As a result, an increase in the direct-current component across one of the load resistors combines with the corresponding decrease across the other load resistor to produce twice the change in the resulting direct-current components across the load impedance 40. This is a desirable feature in phase-detector circuits because such circuits are inherently not very sensitive, and doubling of the gain is a substantial improvement.

What is desired of the ideal phase detector is that the output control signal be dependent only on the phases and frequencies of the two input signals and not additionally dependent on their amplitudes. In other words, in many applications it is highly undesirable to have the output control signal vary when one of the input signals varies. The primary reason why such independence from input signal amplitudes is normally not obtained is due to the difficulty in building a perfectly symmetrical phase-detector circuit in which the two sides thereof accurately balance one another. If the impedance of one side is different from the impedance of the other side, then this unbalance causes one of the detector circuits 14 and 15 to develop a larger direct-current component, thus producing an erroneous component in the output control signal. If this erroneous component were constant and did not vary, it could be tolerated because the other parameters of the APC loop could be proportioned to compensate for it. What is not desired, however, and what will in fact occur is that the unbalance causes the magnitude of the erroneous direct-current component to vary with the amplitude of the input signals. As a result, where one of the input signals is subject to a relatively wide range of amplitude variations, it become extremely difficult, if not impossible, to construct the remainder of the APC loop to compensate for the variable error.

In the case of a color-television receiver, it is the synchronizing-signal input which is subject to a wide range of amplitude variations. The resulting error component in the output control signal is in that case especially likely to give difficulty when the nature of the picture transmission changes from a monochrome transmission to a color transmission. This is because no synchronizing-signal component is translated during a monochrome transmission. As a result, the local subcarrier oscillator of the color receiver will in all probability drift away from its desired operating frequency. Then, upon the commencement of a color transmission, the synchronizing signal suddenly appears. As a result, the control signal output will initially be relatively large in an effort to bring the local oscillator back into synchronism. If on top of this normally large control signal is added a further relatively large error component due to unbalance, then this additional error component may very well be in a direction to overload the APC loop and prevent it from ever bringing the local oscillator into synchronism. As a result, the operation of the phase detector becomes unreliable.

The nature of the problem may be better appreciated when it is realized that the maximum amplitude of the output control signal is only of the order of 2 volts peak-to-peak for the case where the amplitude of the reference signal input is of the order of 60 volts peak-to-peak and the amplitude of the synchronizing signal is of the order of 100 volts peak-to-peak or greater. Only a slight degree of unbalance may readily cause an error component of the order of 2 volts. Also, this error component is subject to a substantial range of variation because in a practical case the amplitude of the synchronizing signal may vary over the range from 0 to 200 volts, depending on operating conditions.

It has been known previously that these phase detectors suffer some unbalance, but the reason for this unbalance has not been known. In accordance with the present invention, it has been discovered that the condenser 50 in the bottom branch of the phase-detector circuit contributes an appreciable amount of the unbalance. It had heretofore been assumed that, because of the relatively large value of the condenser 50, its impedance was negligible. It has been found, however, that this is not actually the case. In fact, the impedance of the condenser 50 cannot be made too great or else the beat-note component occurring when the input signals differ in frequency will be shorted out to ground by way of the grounded center tap of the push-pull secondary 34. The fundamental frequency of this beat-note is relatively low so that the shorting out effect of the condenser 50 was probably ignored without any serious consequence. However, the unbalanced impedance to the higher frequency input signals of the condenser 50 has been found not to be negligible and cannot be overlooked.

To compensate for the impedance of the condenser 50, a compensating impedance 60 is inserted in series in the upper branch of the phase detector. In order to produce the requisite balance, the impedance 60 is proportioned to match the impedance of condenser 50. The impedance 60, however, cannot take the form of a simple condenser because then the direct-current path, which enables the direct-current components across the load resistors 16*a* and 17*a* to combine to produce twice the output change, would be interrupted. The present invention overcomes this by making use of the resistor 61 in shunt with the condenser 62 so that the voltage doubling action is still obtained.

Another important aspect of the compensating impedance 60 occurs for cases like that of a color-television receiver where the synchronizing signal occurs in periodic bursts. In this case, in the absence of the impedance 60, the condenser 50 serves to produce a charging action during the occurrence of the bursts but only in the lower branch of the phase-detector circuit. The condenser 50 subsequently discharges again in between bursts. The fact that the charging action occurs only in one branch of the phase-detector circuit causes a further unmatched or unbalanced direct-current component to be developed. Accordingly, in order to compensate for this, a similar charging action should be introduced in the other branch of the phase-detector circuit, and this charging action should match that in the first branch. This may be provided by adjusting the time constant of the compensating impedance network 60 so that it is approximately the same as the duration of the burst intervals. In the case of a color-television receiver, the duration of the burst interval is approximately 2.5 microseconds, so that the compensating impedance 60 should in this case have a time constant of approximately this value.

When the foregoing precautions have been taken and a compensating impedance properly included in the phase detector, the unbalance in such phase detector will be substantially reduced and the phase detector will be relatively insensitive to any amplitude variations in the input signals, especially the synchronizing signal. Thus, a more reliable phase detector is obtained while still retaining the advantage of the doubled gain inherent in this type of phase detector.

While there has been described what is at present considered to be the preferred embodiment of this invention, it will be obvious to those skilled in the art that various changes and modifications may be made therein without departing from the invention and it is, therefore, aimed to cover all such changes and modifications as fall within the true spirit and scope of the invention.

What is claimed is:

1. A phase detector having improved balance comprising: circuit means for supplying a synchronizing signal; circuit means for supplying a reference signal; a pair of detector circuits each including a rectifier device and having a first type of electrode of each device coupled together and to one of the supply circuit means and having a second type of electrode of each device coupled in push-pull with the other supply circuit means; circuit means coupled to one of the rectifier devices on the push-pull side thereof for deriving an output signal representative of the phase difference between the synchronizing and reference signals; first impedance means for isolating the point at which the output signal is derived from the push-pull input; and second impedance means coupled in the path coupling the other rectifier device to the push-pull input for balancing the effect on the output signal of the first impedance means, thereby rendering the phase detector less sensitive to any amplitude variations of the synchronizing signal.

2. A phase detector having improved balance comprising: circuit means for supplying a synchronizing signal; circuit means for supplying a reference signal; a pair of detector circuits each including a rectifier device; a first coupling circuit for coupling one of the supply circuit means to the rectifier devices in a single-ended manner and having a common output terminal coupled to a first type of electrode of each rectifier device; a second coupling circuit for coupling the other supply circuit means to the rectifier devices in a push-pull manner and having a pair of push-pull output terminals individually coupled to a second type of electrode of each rectifier device; circuit means coupled to one of the rectifier devices on the push-pull side thereof for deriving an output signal representative of the phase difference between the synchronizing and reference signals; first impedance means for isolating the point at which the output signal is derived from the push-pull input; and second impedance means coupled in the path coupling the other rectifier device to the push-pull input for balancing the effect on the output signal of the first impedance means, thereby rendering the phase detector less sensitive to any amplitude variations of the synchronizing signal.

3. A phase detector having improved balance comprising: circuit means for supplying a synchronizing signal; circuit means for supplying a reference signal; a pair of diodes, each shunted by a load resistor and having a first type of electrode of each diode coupled together and to one of the supply circuit means and having a second type of electrode of each diode coupled in push-pull with the other supply circuit means; circuit means coupled to one of the diodes on the push-pull side thereof for deriving an output signal representative of the phase difference between the synchronizing and reference signals; first impedance means for isolating the point at which the output signal is derived from the push-pull input; and second impedance means coupled in the path coupling the other diode to the push-pull input for balancing the effect on the output signal of the first impedance means, thereby rendering the phase detector less sensitive to any amplitude variations of the synchronizing signal.

4. A phase detector having improved balance comprising: circuit means for supplying a synchronizing signal; circuit means for supplying a reference signal; a pair of detector circuits each including a rectifier device and having a first type of electrode of each device coupled together and to one of the supply circuit means and having a second type of electrode of each device coupled in push-pull with the other supply circuit means; an output load impedance coupled to one of the rectifier devices on the push-pull side thereof for deriving an output signal representative of the phase difference between the synchronizing and reference signals; first impedance means for isolating the point at which the output signal is derived from the push-pull input; and second impedance means coupled in the path coupling the other rectifier device to the push-pull input for balancing the effect on the output signal of the first impedance means, thereby rendering the phase detector less sensitive to any amplitude variations of the synchronizing signal.

5. A phase detector having improved balance comprising: circuit means for supplying a synchronizing signal; circuit means for supplying a reference signal; a pair of detector circuits each including a rectifier device and having a first type of electrode of each device coupled together and to one of the supply circuit means and having a second type of electrode of each device coupled in push-pull with the other supply circuit means; circuit means coupled to one of the rectifier devices on the push-pull side thereof for deriving an output signal representative of the phase difference between the synchronizing and reference signals; first impedance means for isolating the point at which the output signal is derived from the push-pull input; and second impedance means coupled in the path coupling the other rectifier device to the push-pull input and having an impedance which is proportioned to match that of the first impedance means for balancing the effect on the output signal of the first impedance means, thereby rendering the phase detector less sensitive to any amplitude variations of the synchronizing signal.

6. A phase detector having improved balance comprising: circuit means for supplying a synchronizing signal; circuit means for supplying a reference signal; a pair of detector circuits each including a rectifier device and having a first type of electrode of each device coupled together and to one of the supply circuit means and having a second type of electrode of each device coupled in push-pull with the other supply circuit means; circuit means coupled to one of the rectifier devices on the push-pull side thereof for deriving an output signal representative of the phase difference between the synchronizing and reference signals; a condenser for isolating the point at which the output signal is derived from the push-pull input; and second impedance means coupled in the path coupling the other rectifier device to the push-pull input for balancing the effect on the output signal of the condenser, thereby rendering the phase detector less sensitive to any amplitude variations of the synchronizing signal.

7. A phase detector having improved balance comprising: circuit means for supplying a synchronizing signal; circuit means for supplying a reference signal; a pair of detector circuits each including a rectifier device and having a first type of electrode of each device coupled together and to one of the supply circuit means and having a second type of electrode of each device coupled in push-pull with the other supply circuit means; circuit means coupled to one of the rectifier devices on the push-pull side thereof for deriving an output signal representative of the phase difference between the synchronizing and reference signals; first impedance means for isolating the point at which the output signal is derived from the push-pull input; and a parallel-connected resistor-condenser network coupled in series in the path coupling the other rectifier device to the push-pull input for balancing the effect on the output signal of the first impedance means, thereby rendering the phase detector less sensitive to any amplitude variations of the synchronizing signal.

8. A phase detector having improved balance comprising: circuit means for supplying a synchronizing signal; circuit means for supplying a reference signal; a pair of diodes, each shunted by a load resistor; a first coupling circuit for coupling one of the supply circuit means to the diodes in a single-ended manner and having a common output terminal coupled to a first type of electrode of each diode; a second coupling circuit for coupling the other supply circuit means to the diodes in a push-pull manner and having a pair of push-pull output terminals individually coupled to a second type of electrode of each diode; an output load impedance coupled to one of the diodes on the push-pull side thereof for deriving an output signal representative of the phase difference between the synchronizing and reference signals; a condenser for isolating the point at which the output signal is derived from the push-pull input; and a parallel-connected resistor condenser network coupled in series in the path coupling the other diode to the push-pull input for balancing the effect on the output signal of the first-mentioned condenser, thereby rendering the phase detector less sensitive to any amplitude variations of the synchronizing signal.

9. A phase detector having improved balance comprising: circuit means for supplying periodic bursts of a sinusoidal synchronizing signal, each burst having a predetermined time duration; circuit means for supplying a reference signal; a pair of detector circuits each including a rectifier device and having a first type of electrode of each device coupled together and to one of the supply circuit means and having a second type of electrode of each device coupled in push-pull with the other supply circuit means; circuit means coupled to one of the rectifier devices on the push-pull side thereof for deriving an output signal representative of the phase difference between the sinusoidal synchronizing signal and the reference signal; first impedance means for isolating the point at which the output signal is derived from the push-pull input; and second impedance means coupled in the path coupling the other rectifier device to the push-pull input and having a time constant corresponding to the time duration of the bursts for balancing the effect on the output signal of the first impedance means, thereby rendering the phase detector less sensitive to any amplitude variations of the synchronizing signal.

10. A phase detector having improved balance comprising: circuit means for supplying periodic bursts of a sinusoidal synchronizing signal, each burst having a predetermined time duration; circuit means for supplying a reference signal; a pair of diodes, each shunted by a load resistor; a first coupling circuit for coupling one of the supply circuit means to the diodes in a single-ended manner and having a common output terminal coupled to a first type of electrode of each device; a second coupling circuit for coupling the other supply circuit means to the diodes in a push-pull manner and having a pair of push-pull output terminals individually coupled to a second type of electrode of each diode; an output load impedance coupled to one of the diodes on the push-pull side thereof for deriving an output signal representative of the phase difference between the sinusoidal synchronizing signal and the reference signal; a condenser for isolating the point at which the output signal is derived from the push-pull input; and a parallel-connected resistor-condenser network coupled in series in the path coupling the other diode to the push-pull input and having a time constant corresponding to the time duration of the bursts for balancing the effect on the output signal of the first-mentioned condenser, thereby rendering the phase detector less sensitive to any amplitude variations of the synchronizing signal.

References Cited in the file of this patent

UNITED STATES PATENTS

| | | |
|---|---|---|
| 2,497,840 | Seeley | Feb. 14, 1950 |
| 2,586,119 | Tellier et al. | Feb. 19, 1952 |
| 2,617,025 | Hugenholtz | Nov. 4, 1952 |

OTHER REFERENCES

S. Wald: "Magnetic Powder Clutch Servo," Radio and Television News; September, 1950, pages 12A, 13A and 26A.